United States Patent
Ohba et al.

(10) Patent No.: US 6,756,910 B2
(45) Date of Patent: Jun. 29, 2004

(54) SENSOR FOR AUTOMATIC DOORS

(75) Inventors: Hiroyuki Ohba, Ohtsu (JP); Yoshihiro Imuro, Ohtsu (JP); Osamu Imanishi, Ohtsu (JP); Mataichi Kurata, Ohtsu (JP)

(73) Assignee: Optex Co., Ltd., Shiga-ken (JP)

( * ) Notice: Subject to any disclaimer, the term of this patent is extended or adjusted under 35 U.S.C. 154(b) by 0 days.

(21) Appl. No.: 10/083,571

(22) Filed: Feb. 27, 2002

(65) Prior Publication Data

US 2002/0118114 A1 Aug. 29, 2002

(30) Foreign Application Priority Data

Feb. 27, 2001 (JP) ........................................ 2001-051502

(51) Int. Cl.[7] ............................................. G08B 21/00
(52) U.S. Cl. ................. 340/686.6; 340/686.1; 340/573.1; 340/540; 340/500; 382/100; 382/103; 382/106; 348/155; 348/152; 348/143; 318/286; 318/626
(58) Field of Search .................... 340/686.6, 686.1, 340/573.1, 540, 500; 382/106, 103, 100; 348/155, 152, 143; 318/286, 626

(56) References Cited

U.S. PATENT DOCUMENTS

| | | | | |
|---|---|---|---|---|
| 4,815,046 A | * | 3/1989 | Dorr ........................... 367/95 |
| 5,001,557 A | * | 3/1991 | Begle ........................... 348/166 |
| 5,541,585 A | * | 7/1996 | Duhame et al. ........... 340/5.62 |
| 5,581,625 A | | 12/1996 | Connell ........................ 382/1 |
| 5,583,405 A | * | 12/1996 | Sai et al. ..................... 318/286 |
| 5,692,061 A | | 11/1997 | Sasada et al. ............... 382/106 |
| 5,793,900 A | | 8/1998 | Nourbakhsh et al. ....... 382/263 |
| 6,345,105 B1 | * | 2/2002 | Nitta et al. ................. 382/100 |
| 6,456,728 B1 | * | 9/2002 | Doi et al. .................... 382/103 |
| 2001/0030689 A1 | * | 10/2001 | Spinelli ....................... 348/155 |

FOREIGN PATENT DOCUMENTS

| | | |
|---|---|---|
| DE | 195 22 760 | 4/1997 |
| JP | 6-138253 | 5/1994 |
| JP | 40629425 A | * 10/1994 |
| JP | 2000-320243 | 11/2000 |

* cited by examiner

*Primary Examiner*—Daniel J. Wu
*Assistant Examiner*—Tai T. Nguyen
(74) *Attorney, Agent, or Firm*—Wenderoth, Lind & Ponack, L.L.P.

(57) ABSTRACT

Cameras take images of a predetermined area around a door. A distance measurement unit measures a distance from the cameras to each object in the taken images. Based on the measured distance, a floor detection unit detects a floor, and an object height/position detection unit detects a height and position of any object other than the floor. A door position detection unit and a door position identification unit 57 specify position of the door (i.e. open or closed) in the images taken by the cameras. A judgement unit judges presence or absence of an object which is neither the floor nor the door. If an object other than the floor and the door is observed in the images taken by the cameras, an output unit produces an object detection signal, so that the door is kept in an open state.

14 Claims, 8 Drawing Sheets

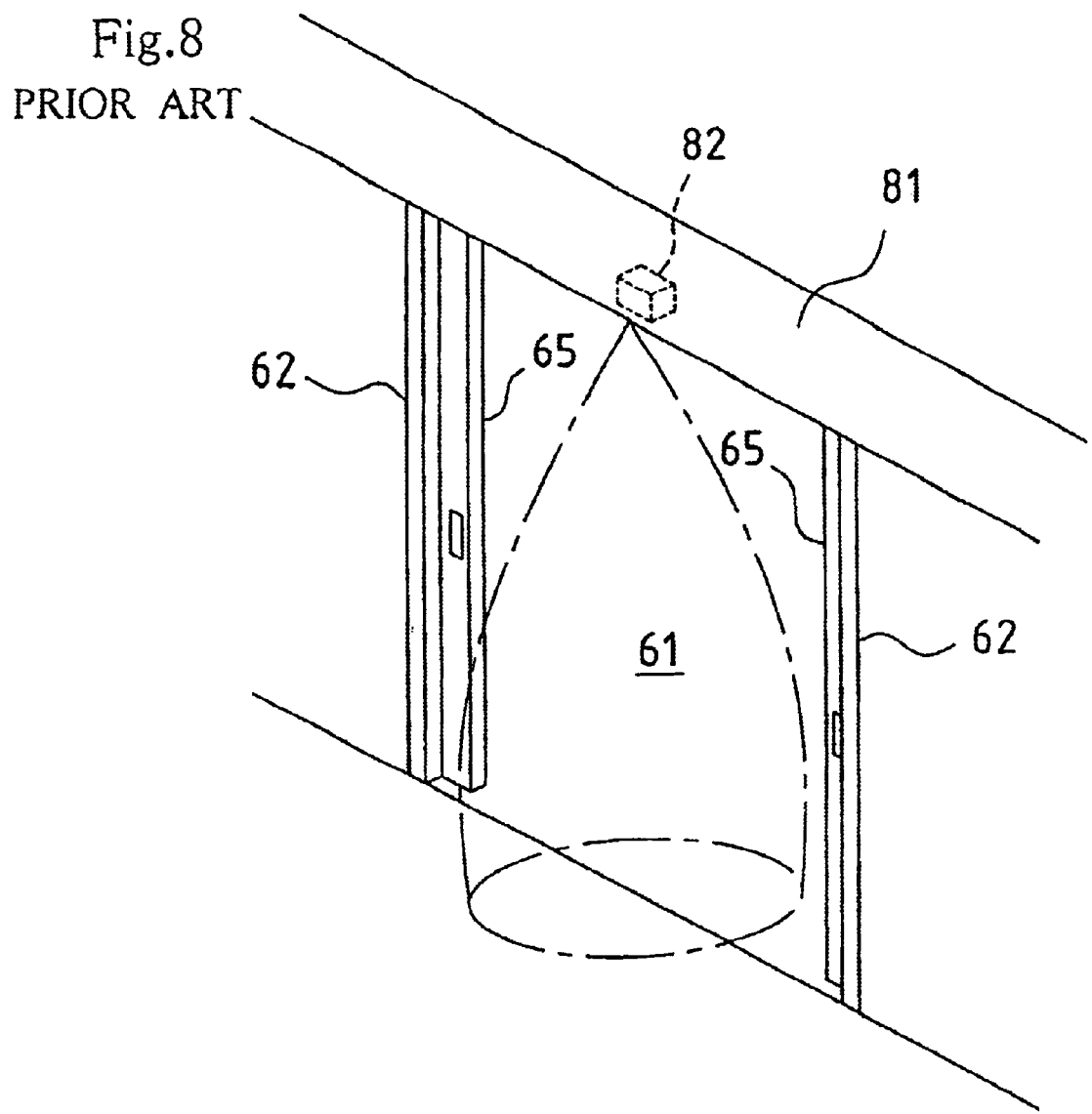

SENSOR FOR AUTOMATIC DOORS

BACKGROUND OF THE INVENTION

The present invention relates to a sensor for automatic doors. In particular, the present invention concerns measures to conduct an object detection operation in a predetermined area without fail, thereby enhancing reliability of opening/closing action of automatic doors.

With respect to an automatic door which opens and closes along a track, an object detection range is usually set on an interior and an exterior of a doorway, and objects in a respective detection range are detected by an activation sensor. The activation sensor generally includes sensor mats, ultrasonic sensors and passive/active infrared sensors. On detecting entry of an object within the respective detection range, the activation sensor is turned on and operates to open the door.

In addition to the activation sensor, an auxiliary safety sensor is disposed in the vicinity of the track of the door, between interior and exterior detection ranges. As disclosed in Japanese Patent Laid-open Publication No. 2000-320243, the auxiliary safety sensor makes use of light beams (e.g. infrared rays). Typically, the auxiliary safety sensor can be classified into the three types.

A first type of auxiliary safety sensor is shown in FIGS. 6(A) and 6(B). FIG. 6(A) is a front view of an automatic door and FIG. 6(B) is a sectional view taken along line B—B in FIG. 6(A). As illustrated, beam sensors are mounted on a pair of posts 62, 62 which stand on both sides of a doorway 61. Transmitters 63, 63 on one of the posts are positioned face to face with receivers 64, 64 on the other post. The structure in FIGS. 6(A) and 6(B) employs two beam sensors, each of which is composed of a transmitter 63 and a receiver 64. In each sensor, when a light beam is emitted from the transmitter 63 towards the receiver 64 and interrupted by a person or the like, the receiver 64 fails to receive the light beam. The sensor regards this condition as presence of an object near a track of doors 65. Based on this recognition, the auxiliary safety sensor holds the doors 65 open, even when the activation sensor is turned off.

A second type of auxiliary safety sensor is shown in FIGS. 7(A) and 7(B). FIG. 7(A) is a front view of an automatic door and FIG. 7(B) is a sectional view taken along line B—B in FIG. 7(A). As illustrated, a transmitter 63 and a receiver 64 are mounted at an end of a first door 651, whereas mirrors 71, 71 are equipped at an end of a second door 652 in order to reflect light emitted from the transmitter 63 back to the receiver 64. Similar to the first type of auxiliary safety sensor, when a light beam is emitted from the transmitter 63 and interrupted by a person or the like, the receiver 64 fails to receive the light beam. The sensor regards this condition as presence of an object near a track of the doors 651, 652. Based on this recognition, the auxiliary safety sensor holds the doors 651, 652 open, even when the activation sensor is turned off. Such auxiliary safety sensor is disclosed, for example, in Japanese Patent Laid-open Publication No. H6-138253.

A third type of auxiliary safety sensor is shown in FIG. 8. An ultrasonic sensor 82 is built in a transom 81 above a doorway 61 and produces ultrasonic waves toward and around a track of doors 65. In FIG. 8, a detection area of the ultrasonic sensor 82 is defined by a dash-dotted line. According to this sensor, a sensor signal from the ultrasonic sensor 82 is considered valid only when the doors 65 are fully open. On the other hand, when the doors 65 are fully closed, or in a course of closing, any sensor signal from the ultrasonic sensor 82 is considered invalid. This principle prohibits the sensor 82 from wrongly detecting closing doors 65 as a person or other object, so that the doors 65 are not made to unnecessarily open.

However, these conventional sensors present various problems as mentioned below.

As for the first type of auxiliary safety sensor (FIGS. 6(A) and 6(B)), a detectable object is limited to an object which stands at or passes through a height and position where either pair of the transmitters 63, 63 and the receivers 64, 64 is mounted (i.e. at a height indicated by dash-dotted lines). In this case, the sensor fails to detect a small object located on the track (e.g. an object 66 depicted by an imaginary line i in FIG. 6). Consequently, the doors 65, 65 close as soon as the activation sensor is turned off, catching the object 66 between the doors 65, 65. As another problem, because the transmitters 63, 63 and the receivers 64, 64 are mounted on the posts 62, 62, it is impossible to direct light beams vertically above the track. Again, the sensor may fail to detect an object which lies on the track. In other words, if an object 67 is located at a position depicted by an imaginary line j in FIG. 6, the sensor cannot detect the object 67, which is high enough for the height and position of light beams, but which fails to block the light beams. Furthermore, installation of the transmitters 63, 63 and the receivers 64, 64 involves a complicated arrangement of wiring through an interior of the posts 62, 62.

The second type of auxiliary safety sensor (FIGS. 7(A) and 7(B)) can direct a light beam vertically above the track, thereby being capable of detecting an object which lies on the track. However, as with the first type of auxiliary safety sensor, a detectable object is limited to an object which stands at or passes through a height and position of either of the light beams. Referring to FIGS. 7(A) and 7(B), the sensor fails to detect a small object 66 laid on the track, as depicted by an imaginary line i. Moreover, installation of the second type of auxiliary safety sensor is more complex than that of the first type, because the transmitter 63 and the receiver 64 of the second type are mounted on the door 651 and need to have wiring arranged through an interior of the door 651.

The third type of auxiliary safety sensor (FIG. 8) solves the problem of arranging wiring through the interior of the posts 62, 62 or the doors 65, 65, and thus improves installation workability. However, this sensor has a different problem, because a signal from the ultrasonic sensor 82 is invalidated as soon as the doors 65, 65 start a closing action. Namely, once the doors 65, 65 start to close, it is impossible to detect a person coming from an area which is not covered by the ultrasonic sensor 82.

As mentioned above, none of the conventional sensors for automatic doors provides sufficient reliability in object detection. Therefore, there have been considerable demands for a sensor for automatic doors which can ensure satisfactory reliability with regard to object detection.

SUMMARY OF THE INVENTION

The present invention is made in view of the above problems. An object of the present invention is to provide a sensor for an automatic door which can ensure detection of an object in a predetermined area around the automatic door, thereby enhancing reliability of an opening/closing action of the automatic door.

In order to accomplish this object, the present invention intends to improve reliability of an object detection operation in the following manner. According to the present invention, image pickup means such as a CCD camera takes an image of a predetermined area around a door. From this image, a distance between the image pickup means and each object in the predetermined area is measured. Based on the measured distance, a sensor identifies presence or absence of an object which excludes a background object (e.g. a floor, a wall and the like) and the door.

A sensor for an automatic door according to a first aspect of the invention (hereinafter referrd to as Invention 1) is composed of image pickup means, distance measurement means, object identification means and output means. The image pickup means is capable of taking an image of a predetermined area around a door. The distance measurement means measures a distance between the image pickup means and each object that is in the predetermined area and observed in the image taken of the predetermined area, on receiving an output from the image pickup means. The object identification means identifies presence of an object which is neither a background object nor the door, on receiving an output from the distance measurement means.

Initially, each object for which a distance from the image pickup means is measured is identified either as a background object or as an object other than the background object, based on the measured distance. Then, each object other than the background object is identified either as the door or as an object other than the door. The output means outputs an object detection signal, on receiving an output from the object identification means. This object detection signal is produced, with a proviso that an object which is neither the background object nor the door is observed in the image taken of the predetermined area.

According to these features, once the image pickup means takes an image of the predetermined area around the door, the distance measurement means measures the distance between the image pickup means and each object observed in the image. Based on this information, the object identification means identifies the presence or absence of an object in the predetermined area excluding the background object and the door. If such object is present, the output means produces an object detection signal. This signal serves, for example, to keep the door in a fully open state. Thus, in order to identify the presence or absence of an object to be detected (e.g. a person), this sensor relies on the image taken of the predetermined area around the door. As a result, compared with beam sensors, the sensor of Invention 1 can have an extensive detectable range. Further, regarding identification of the presence or absence of the object, the sensor considers information except information relating to the door. Hence, even when the door is observed in the image taken by the image pickup means, the sensor ensures a reliable object detection operation, without mistaking the door for a person or the like.

A sensor for an automatic door according to a second aspect of the invention (hereinafter referred to as Invention 2) is composed of image pickup means, distance measurement means, floor detection means, object height/position detection means, door position detection means, door position identification means, judgement means and output means. The image taking means is capable of taking an image of a predetermined area which covers a track of a door. The distance measurement means measures a distance between the image pickup means and each object observed in the image taken of the predetermined area, on receiving an output from the image pickup means. The floor detection means detects a floor and a height and position of the floor, on receiving an output from the distance measurement means. At this stage, the floor is detected from any object for which a distance from the image pickup means is measured. The object height/position detection means detects a height and position of an object other than the floor, on receiving outputs from the distance measurement means and the floor detection means. It should be understood that the object other than the floor is an object which is observed in the image taken by the image pickup means covering the predetermined area, and which is located at a different height and position relative to the height and position of the floor. The door position detection means is capable of detecting whether the door is in an open position or a closed position along the track. The door position identification means identifies a position of the door in the image, on receiving an output from the door position detection means, based on the detected position of the door. The judgement means judges whether the object which is observed in the image taken of the predetermined area, and which is other than the floor, is the door or an object other than the door, on receiving outputs from the object height/position detection means and the door position identification means. The output means outputs an object detection signal, on receiving an output from the judgement means. The object detection signal is produced, with a proviso that the object which is neither the floor nor the door is observed in the image taken of the predetermined area.

Similar to Invention 1, these features realize a detection operation in the following manner. Once the image pickup means takes an image, the sensor of Invention 2 obtains information on a distance between the image pickup means and each object observed in the image. Based on this information, the sensor judges presence or absence of an object other-than the floor and the door. Therefore, the sensor can have an extensive detectable range and perform a reliable object detection operation, without mistaking the door for a person or the like. In particular, Invention 2 specifies an operation for distinguishing the floor (a background object) from any object other than the floor, and also specifies an operation for identifying a door position. These features serve to improve practicality of the sensor for an automatic door.

A sensor for an automatic door according to a third aspect of the invention (hereinafter referred to as Invention 3) features a specific operation of the output means for producing an object detection signal. In detail, the sensor of Invention 1 or Invention 2 is associated with door drive control means for controlling an open/close drive of the door along the track. In the sensor of Invention 3, the output means is arranged to be capable of outputting the object detection signal to the door drive control means, such that the object detection signal outputted to the door drive control means causes the door to open fully. These features prevent accidental closure of the door, while a person or the like is present near the track of the door. Eventually, the features of Invention 3 enhance reliability with regard to opening/closing action of the automatic door.

Sensors for automatic doors, according to fourth and fifth aspects of the invention (hereinafter referred to as Invention 4 and Invention 5, respectively), are featured by specific operations of the distance measurement means for measuring the distance between the image pickup means and each object in the predetermined area. With respect to any of Invention 1 to Invention 3, the sensor of Invention 4 employs image pickup means which has a plurality of image pickup elements. In the sensor of Invention 4, the distance measurement means is arranged to measure the distance to each object in the predetermined area, by stereo image processing which utilizes parallax of images taken by these image pickup elements.

Further, with respect to any of Invention 1 to Invention 3, the sensor of Invention 5 employs image pickup means which has a variable focus lens. In the sensor if Invention 5, the distance measurement means is arranged to measure the distance to each object, based on degree of focus on the object which is observed in the image taken by the image pickup means.

These features enable accurate measurement of the distance between the image pickup means and each object in the image taken by the image pickup means. In particular, the sensor of Invention 5 can simplify structure of the image pickup means, because the image pickup means associated therewith requires no more than one image pickup element.

Sensors for automatic doors, according to sixth and seventh aspects of the invention(hereinafter mentioned as Invention 6 and Invention 7, respectively), are featured by specific operations of the door position detection means for detecting the position of the door (i.e. open or closed). With respect to Invention 2, the sensor of Invention 6 is associated with door drive control means for controlling an open/close drive of the door along the track. This door drive control means produces an output signal corresponding to a position of the door. In the sensor of Invention 6, the door position detection means is arranged to be capable of receiving an output signal from the door drive control means, and to detect whether the door is in an open position or a closed position, based on the received output signal. By way of illustration, the door drive control means is arranged to output a pulse signal, wherein the number of pulses depends on the position of the door (i.e. open or closed). The door position detection means is arranged to receive the pulse signal and to detect whether the door is in the open position or the closed position, based on the number of pulses.

Also with respect to Invention 2, the sensor of Invention 7 arranges the door position detection means to detect whether the door is in an open position or a closed position, based on the image taken by the image pickup means. For example, a door position (i.e. open or closed) is detected in accordance with a position and angle of an edge of the door in the image taken by the image pickup means.

These features enable accurate detection of the door position (i.e. open or closed). In particular, the sensor of Invention 7 can simplify structure of the automatic door as a whole, by omitting a sensor or the like specially arranged to detect whether the door is in the open position or the closed position.

BRIEF DESCRIPTION OF THE DRAWINGS

FIGS. 6(A) and 6(B) relate to a first type of conventional auxiliary safety sensor, wherein FIG. 6(A) is a front view of an automatic door equipped with this auxiliary safety sensor, and FIG. 6(B) is a sectional view taken along line B—B in FIG. 6(A).

FIGS. 7(A) and 7(B) relate to a second type of conventional auxiliary safety sensor, wherein FIG. 7(A) is a front view of an automatic door equipped with this auxiliary safety sensor, and FIG. 7(B) is a sectional view taken along line B—B in FIG. 7(A).

FIG. 8 shows a third type of conventional auxiliary safety sensor.

DETAILED DESCRIPTION OF THE PREFERRED EMBODIMENTS

Embodiments of the present invention are hereinafter described with reference to the drawings. In these embodiments, a sensor for automatic doors according to the present invention is applied as an auxiliary safety sensor.

Figure 1:
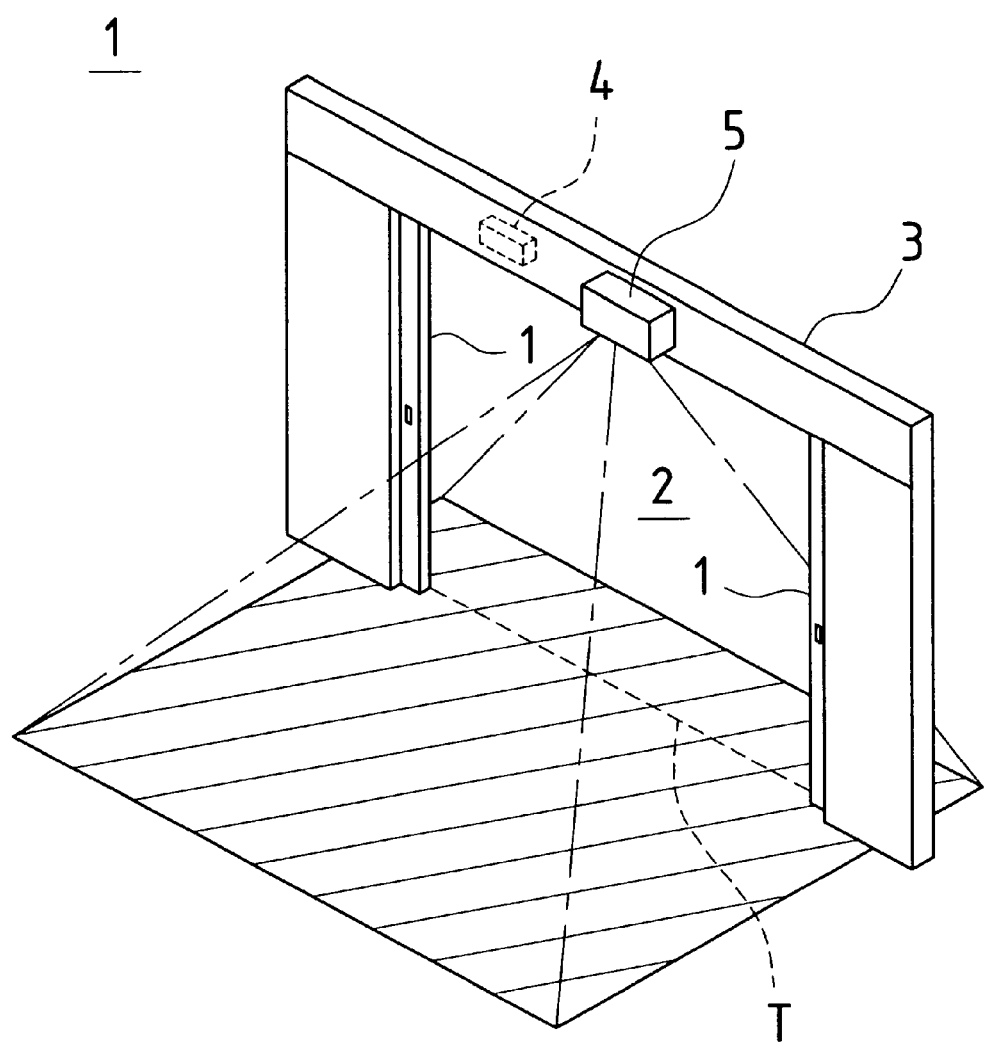
FIG. 1 is a perspective view showing an automatic door and a doorway of the automatic door, according to an embodiment of the present invention.

FIG. 1 is a perspective view of a first embodiment of the invention showing an automatic door and a doorway of the automatic door. As shown, the automatic door used in this embodiment is a bi-parting door which has two door segments 1, 1 movable in opening/closing directions (movable in horizontal directions) along a track T (shown by a broken line in FIG. 1). A detection area of an activation sensor (not shown) is set on an interior and an exterior of a doorway 2. When a person or the like enters the detection area, the activation sensor detects its presence and produces an object detection signal. This signal is sent to an automatic door controller 4 (door drive control means) housed in a transom 3. On receiving the object detection signal, the automatic door controller 4 starts a driving motor of a door opening/closing mechanism (not shown) in order to open the door segments 1, 1. Since the opening/closing mechanism of the door segments 1, 1 is well known in the art, its description is omitted herein. As for the activation sensor, a common ultrasonic or pyroelectric sensor is adoptable.

The transom 3 mounts an auxiliary safety sensor 5, which is a feature of the present embodiment as detailed below.

Figure 2:
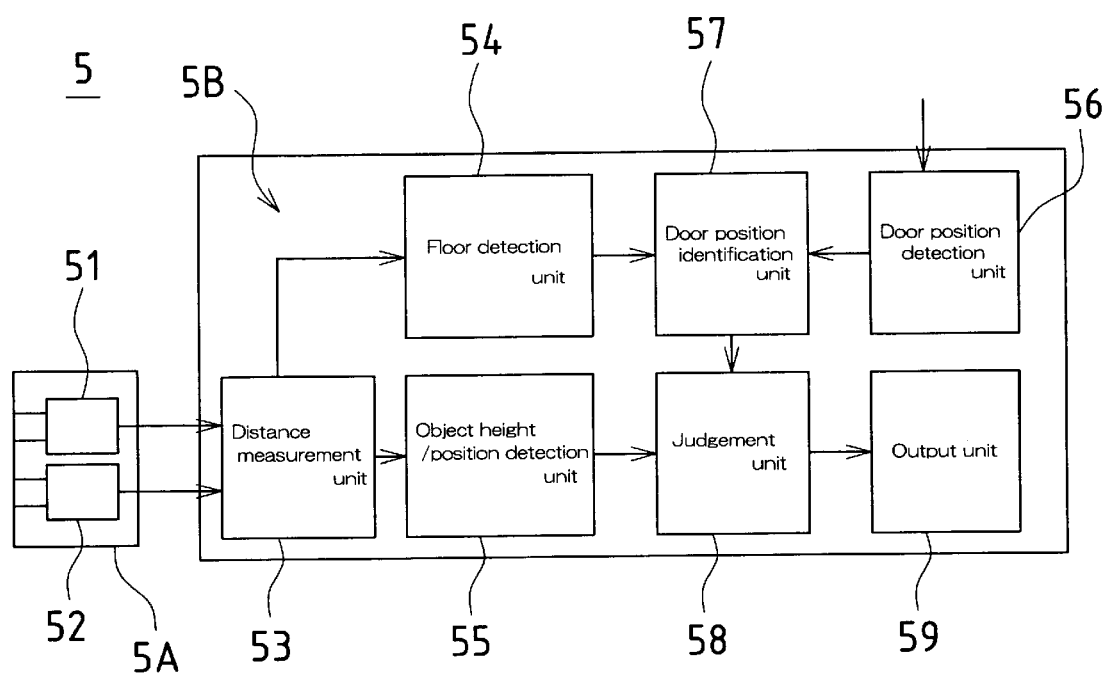
FIG. 2 is a block diagram showing a constitution of an auxiliary safety sensor, according to an embodiment of the present invention.

FIG. 2 is a block diagram showing a general constitution of the auxiliary safety sensor 5. As shown, the auxiliary safety sensor 5 is composed of two cameras 51, 52 (each having a built-in image pickup element such as CCD) as image pickup means, a distance measurement unit 53 as distance measurement means, a floor detection unit 54 as floor detection means, an object height/position detection unit 55 as object height/position detection means, a door position detection unit 56 as door position detection means, a door position identification unit 57 as door position identification means, a judgement unit 58 as judgement means, and an output unit 59 as output means.

Figure 3A:
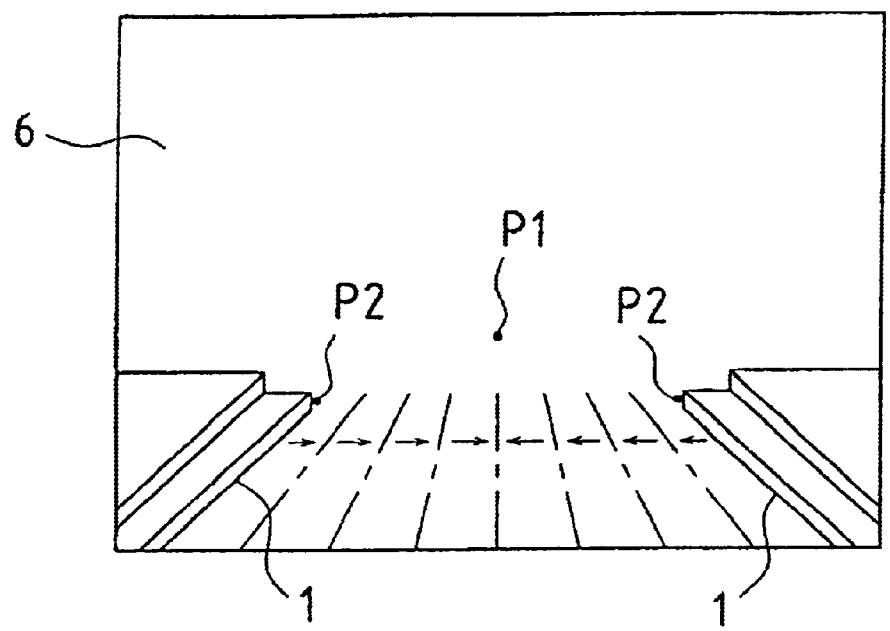
FIG. 3(A) represents an image taken when the door of FIG. 1 is fully open.
Figure 3B:
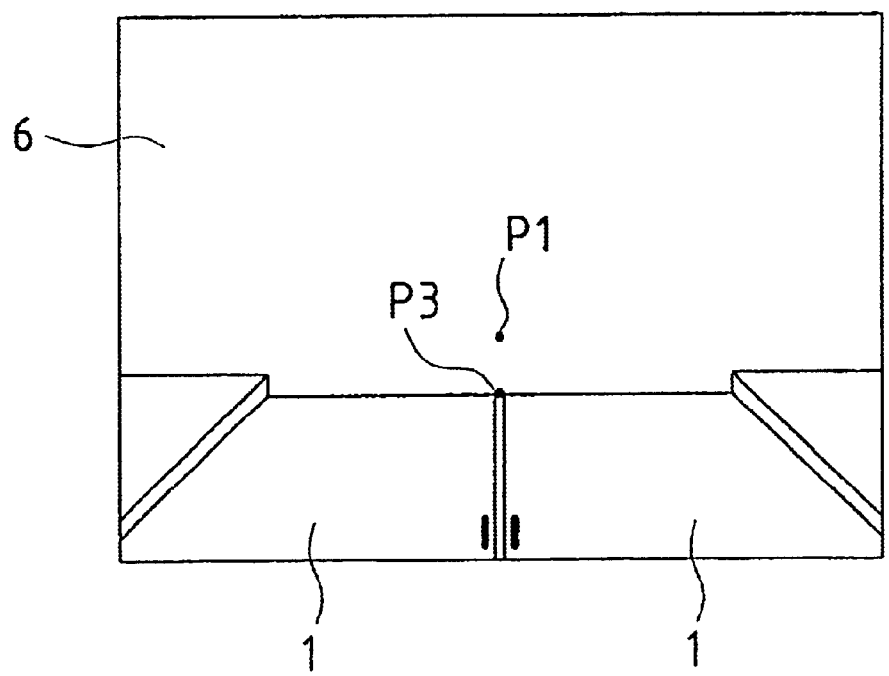
FIG. 3(B) represents an image taken when the door of FIG. 1 is fully closed.

The cameras 51, 52 are contained in a sensor casing 5A, with their optical axes oriented parallel to each other. Incidentally, the optical axes of the cameras 51, 52 may not necessarily be parallel, but may be oriented in slightly different directions relative to each other. The sensor casing 5A is mounted on the transom 3, such that image pickup directions of the cameras 51, 52 are oriented at predetermined elevation angles relative to a vertically downward direction. Thus, each of the cameras 51, 52 can take an image of a prescribed image pickup area including the track T of the door segments 1, 1 (hatched area in FIG. 1). FIG. 3(A) represents an image taken when the door segments 1, 1 are fully open. FIG. 3(B) represents an image taken when the door segments 1, 1 are fully closed.

The distance measurement unit 53 receives information which relates to images taken by the cameras 51, 52. Then, the unit 53 measures a distance between the cameras 51, 52 and each object that is in the image pickup area and in the images taken by the cameras, by so-called stereo image processing. To be specific, between the image taken by the camera 51 and the image taken by the camera 52, the unit 53 measures displacement (i.e. "parallax") of each object observed in both images. The distance between the cameras 51, 52 and the object is measured according to the following equation (1):

$$K = 2af/S \qquad (1)$$

wherein K represents the distance between the cameras 51, 52 and an object, 2a indicates a spacing between the cameras 51, 52, f represents a focal distance of lenses of the cameras 51, 52, and S represents the parallax.

In this embodiment, "the object for which the distance K from the cameras 51, 52 is measured" encompasses all objects which are present in the above-defined image pickup area, including not only a person and like object but also a floor 6 (the background object in the sense of the present invention), the door segments 1, 1, and the like.

Figure 4:
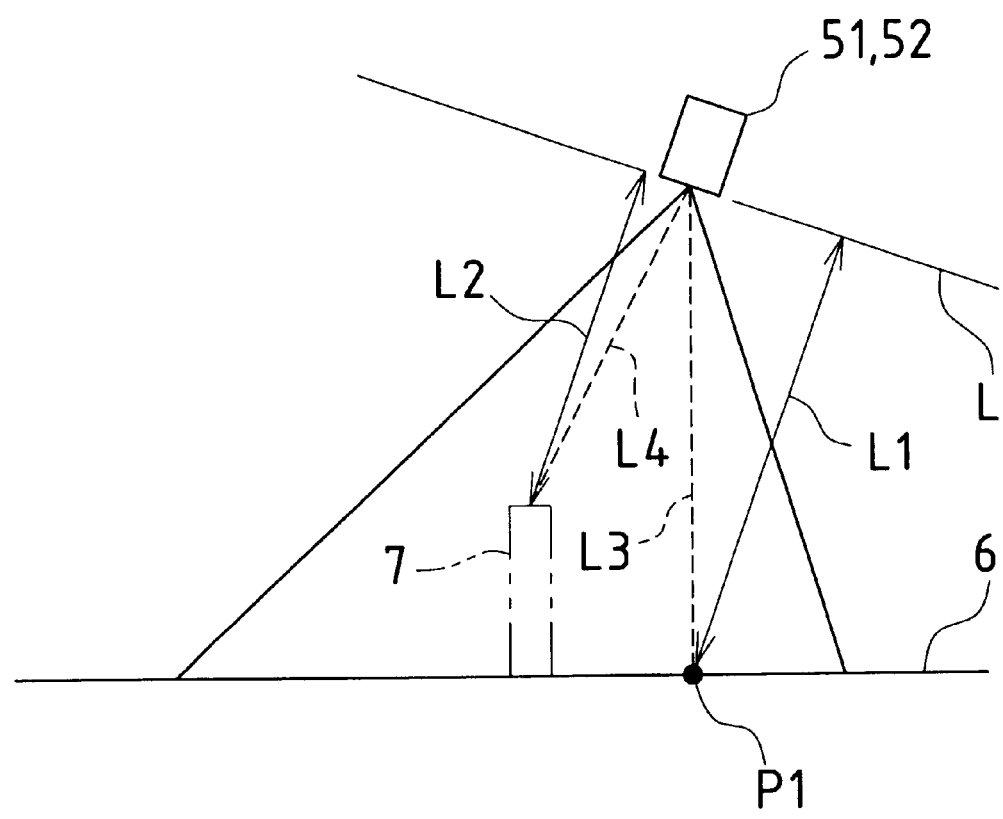
FIG. 4 is an illustration describing an operation for measuring a distance between cameras and each object in an image taken by the cameras.

Regarding the general stereo image processing, the distance between the cameras 51, 52 and each object is obtained as a distance of a straight line which extends orthogonally relative to plane L in FIG. 4 (the plane L is a plane orthogonal to an image pickup direction of the cameras 51, 52), namely, as a linear distance parallel to the image pickup direction of the cameras 51, 52. To be specific, the distance from the cameras 51, 52 to the floor 6 is measured as L1. In the presence of an object 7 (depicted by an imaginary line in FIG. 4), a distance from the cameras 51, 52 to the object 7 is measured as L2. To obtain an actual distance between the cameras 51, 52 and each object (L3 is an actual distance from the cameras 51, 52 to the floor 6, and L4 is an actual distance from the cameras 51, 52 to the object 7), the distance measured by the foregoing computation is corrected by a trigonometric function. In some cases, the measured distance can be directly used as the actual distance without a significant error. Then, it is possible to omit distance correction and proceed to a subsequent operation.

After the distance measurement unit 53 measures the distances between the cameras 51, 52 and the objects (the floor 6, the door segments 1, 1, a person or like object), the floor detection unit 54 recognizes the floor 6 among these objects, and detects a height and position of the floor 6. To be specific, in a test operation of the automatic door, after the distance measurement unit 53 measures distances from the cameras 51, 52 to all objects, the floor detection unit 54 recognizes, as the floor 6, an object which is located vertically under the cameras 51, 52. To be more specific, in the test operation of the automatic door, an area vertically under the cameras 51, 52 is cleared of any object except the floor 6. In this situation, the distance measurement unit 53 measures a distance to an object which is present vertically under the cameras 51, 52, and also detects a point which is located vertically thereunder in images taken by the cameras (the point P1 in FIGS. 3(A) and 3(B) and FIG. 4). According to this information, any object which is located at the same height and position as the point P1 is recognized as the floor 6 by the floor detection unit 54. In this manner, the floor detection unit 54 recognizes a positional relationship between the cameras 51, 52 and the floor 6, such as a mounting height and position of the cameras 51, 52 relative to the floor 6 (i.e. the height and position of the floor 6) and an elevation angle of the cameras 51, 52.

The object height/position detection unit 55 receives output signals from the distance measurement unit 53 and the floor detection unit 54. Then, the unit 55 detects a height and position of all objects, except the floor 6, which are observed in the images taken by the cameras 51, 52. In the unit 55, any object which is located at the same height and position as the position-recognized floor 6 is recognized as the floor 6. Based on this recognition, the unit 55 fetches information which solely relates to any object located at a different height or position relative to the floor 6 (any object whose height and position is not identical to that of the floor 6), and acquires information with regard to height and position of this object.

The door position detection unit 56 detects whether the door segments 1, 1 are in open positions or closed positions along the track T. In a specific method for detecting open/closed positions of the door segments 1, 1, the automatic door controller 4 is arranged to produce a pulse signal which corresponds to positions of the door segments 1, 1 (i.e. open or closed). On receiving the pulse signal, the door position detection unit 56 is arranged to detect whether the door segments 1, 1 are in the open positions or the closed positions. For example, the number of pulses is set to 0 per unit time to indicate a fully closed state of the door segments 1, 1, whereas the number of pulses is set to 255 per unit time to indicate a fully open state of the door segments 1, 1. The automatic door controller 4 is arranged to output a gradually increasing number of pulses, as the door segments 1, 1 move from the fully closed state to the fully open state. With this arrangement, the door position detection unit 56 can accurately detect the open/closed positions of the door segments 1, 1.

The door position identification unit 57 receives an output signal from the door position detection unit 56. Based on detected open/closed positions of the door segments 1, 1, the unit 57 identifies positions of the door segments 1, 1 in images taken by the cameras 51, 52. For example, as illustrated in FIG. 3(A), when the door segments 1, 1 are fully open, as indicated by an output of 255 pulses, edge positions of the door segments 1, 1 in the images taken by the cameras are identified at points P2, P2. Turning to FIG. 3(B), when the door segments 1, 1 are fully closed, as indicated by an output of no pulses, edge positions of the door segments 1, 1 in the images taken by the cameras are identified at point P3. In other words, when the number of pulses is 255, the unit 57 recognizes objects located at the points P2, P2 as the door segments 1, 1. Likewise, when the number of pulses is 0, the unit 57 recognizes objects located at the point P3 as the door segments 1, 1.

The judgement unit 58 receives outputs from the object height/position detection unit 55 and the door position identification unit 57. Then, the unit 58 judges whether each object observed in the images taken by the cameras 51, 52 is a door segment 1 or an object other than the door segment 1. During this operation, the judgement unit 58 recognizes presence of an object which is located higher than the floor 6, based on information from the object height/position detection unit 55. In addition, the unit 58 recognizes current positions of the door segments 1, 1, based on information from the door position identification unit 57. In other words, among objects which are located higher than the floor 6, objects located at the current positions of the door segments 1, 1 are recognized as the door segments 1, 1. Based on this recognition, the judgement unit 58 detects presence or absence of any object other than the door segments 1, 1, and eventually determines whether an object to be detected (e.g. a person) is present in the image pickup area.

As described above, the floor detection unit 54, the object height/position detection unit 55, the door position detection unit 56, the door position identification unit 57 and the judgement unit 58 constitute object identification means 5B of the present invention.

The output unit 59 receives an output from the judgement unit 58. If the images of the predetermined area taken by the camera 51, 52 include any object which is neither the floor 6 nor the door segments 1, 1, the output unit 59 produces an object detection signal for the automatic door controller 4. In response to this signal, the automatic door controller 4 controls a driving motor for the door opening/closing mechanism, so as to keep the door segments 1, 1 in the open state, or to open closing or closed door segments 1, 1.

The object detection operation of this auxiliary safety sensor 5 takes place in the following manner.

To begin with, in a test operation of an automatic door, an area vertically under the cameras 51, 52 is cleared of any object except the floor 6. In this situation, the distance measurement unit 53 measures a distance to an object which is present vertically under the cameras 51, 52, based on image information from the cameras 51, 52. Then, the unit 53 detects a point which is located vertically under the cameras 51, 52 in the images taken by the cameras (the point P1 in FIG. 3(A), FIG. 3(B) and FIG. 4). Then, the floor detection unit 54 recognizes any object as the floor 6, so long as such object is located at the same height and position as the point P1.

During normal operation of the automatic door after the test operation, the cameras 51, 52 take images of a predetermined image pickup area which covers the track T of the door segments 1, 1, at fixed time intervals. Information of the taken images is sent to the distance measurement unit 53, where a distance between the cameras 51, 52 and each object that is in the predetermined image pickup area and in the images taken by the cameras 51, 52 is measured by stereo image processing of these images as detailed above. An object for which this distance is measured is understood to include not only a person and like object, but also the floor 6, the door segments 1, 1, and the like.

Data on a measured distance to each object is sent to the object height/position detection unit 55. The unit 55 detects height and position of all objects in the images taken by the cameras 51, 52, except the floor 6 whose position is already recognized by the floor detection unit 54. Namely, among objects in the images taken by the cameras, the object height/position detection unit 55 fetches information which solely relates to any object located at a different height or position relative to the position-recognized floor 6, and acquires information on height and position of this object.

On the other hand, the door position detection unit 56 detects whether the door segments 1, 1 are in open positions or closed positions along the track T, based on the number of pulses generated by the automatic door controller 4. On receiving an output signal from the door position detection unit 56, and based on detected open/closed positions of the door segments 1, 1, the door position identification unit 57 identifies positions of the door segments 1, 1 in the images taken by the cameras 51, 52. For example, as illustrated in FIG. 3(A), when the door segments 1, 1 are fully open, edge positions of the door segments 1, 1 in the images taken by the cameras are identified at points P2, P2. Turning to FIG. 3(B), when the door segments 1, 1 are fully closed, edge positions of the door segments 1, 1 in the images taken by the cameras are identified at point P3.

After these operations, the judgement unit 58 receives outputs from the object height/position detection unit 55 and the door position identification unit 57. Then, the unit 58 judges whether each object observed in the images taken by the cameras 51, 52 is a door segment 1 or an object other than the door segment 1. In this manner, the unit 58 judges whether an object to be detected (e.g. a person) is present in the image pickup area. If the presence of a person or like object (an object other than the floor 6 and the door segments 1, 1) is recognized, a judgement signal is transmitted from the judgement unit 58 to the output unit 59. In response to this signal, the output unit 59 outputs an object detection signal to the automatic door controller 4. On receiving the object detection signal, the automatic door controller 4 either keeps the door segments 1, 1 in an open state, or opens the door segments against a closing motion or from a closed state.

As described above, the sensor of the present embodiment is arranged to measure distance between the cameras 51, 52 and each object observed in images taken by the cameras 51, 52 covering a predetermined area around a door. This information is utilized for judgement of presence or absence of any object except the floor 6 and the door segments 1, 1. In the case where an object other than the floor 6 and the door segments 1, 1 is observed in the images taken by the cameras, the door segments 1, 1 are either kept in an open state, or made to open against a closing motion or from a closed state. Hence, the present embodiment can extend a detectable range of the sensor, as opposed to conventional beam sensors. Additionally, for identification of presence or absence of an object, the sensor of the present embodiment considers information which excludes information relating to the door segments 1, 1. Therefore, even if the door segments 1, 1 are observed in the images taken by the cameras 51, 52, the sensor ensures a reliable object detection operation, without mistaking the door segments 1, 1 for a person or like object. As a result, it is possible to enhance reliability of an opening/closing action of the automatic door.

As a modified embodiment, distance between the cameras 51, 52 and an object can be measured in a different manner. In this modified embodiment, the image pickup means is constituted by a camera having a variable focus lens. When this camera takes an image, image information is sent to distance measurement unit 53. The distance measurement unit 53 measures a distance to an object, based on degree of focus on the object which is observed in the image taken by the camera.

Another modified embodiment relates to the means for detecting whether the door segments 1, 1 are in open positions or closed positions. In this modified embodiment, the door position detection means 56 detects positions of the door segments 1, 1 (i.e. open or closed), based on images taken by the cameras 51, 52. Referring to FIG. 3(A), while the door segments 1, 1 are closing from a fully open state in the directions of arrows, edge positions of the door segments 1, 1 are displaced as shown by dash-dotted lines in FIG. 3(A). At the same time, provided that the images taken by the cameras are viewed as a two-dimensional plane, an inclination angle relative to these edges varies as well. Accordingly, it is possible to detect positions of the door segments 1, 1 (i.e. open or closed), by recognizing edges of the door segments 1, 1 in the images taken by the cameras, together with positions and an inclination angle of these edges.

Figure 5:
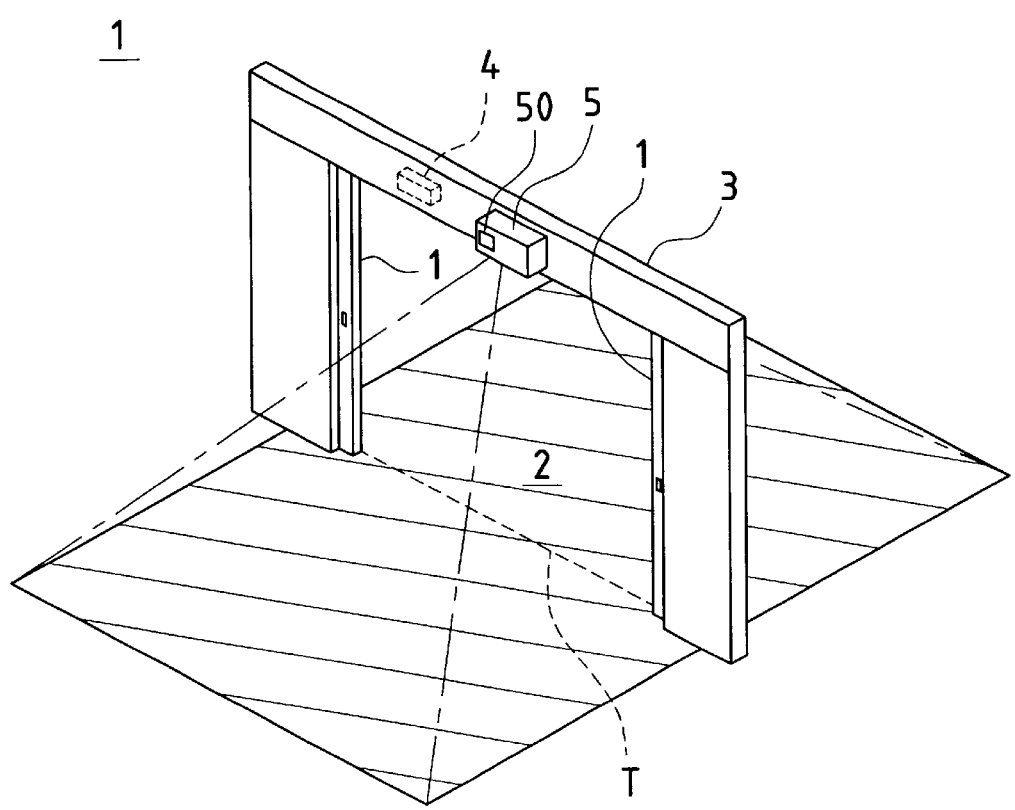
FIG. 5 is a view equivalent to FIG. 1, in which a sensor for an automatic door according to the present invention combines functions of an auxiliary safety sensor and an activation sensor.
Figure 6A:
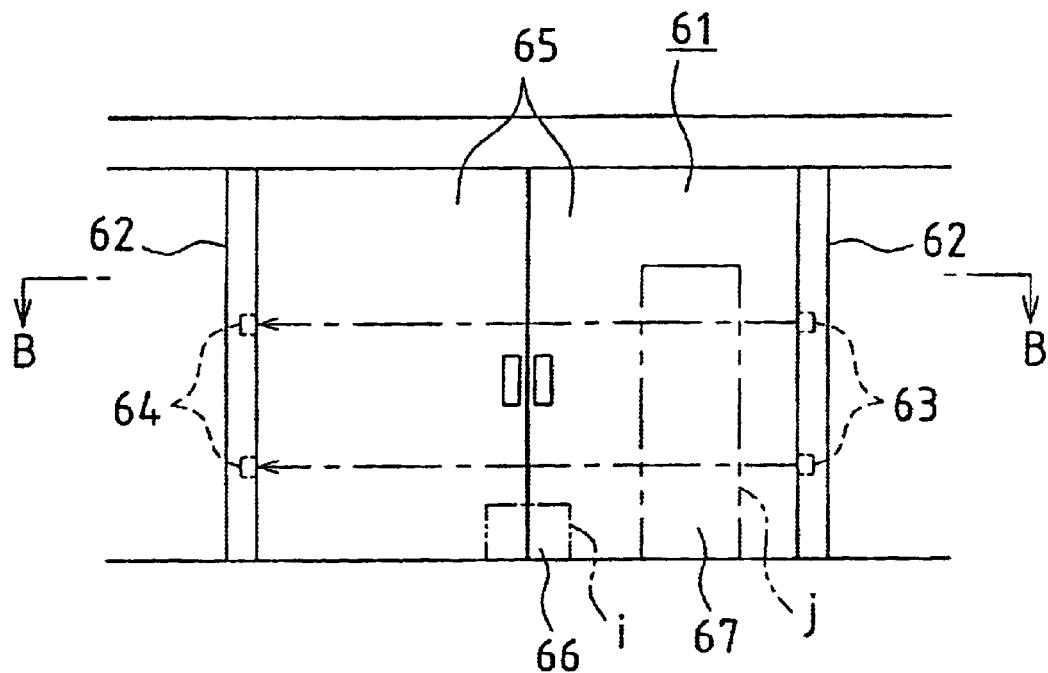
Figure 6B:
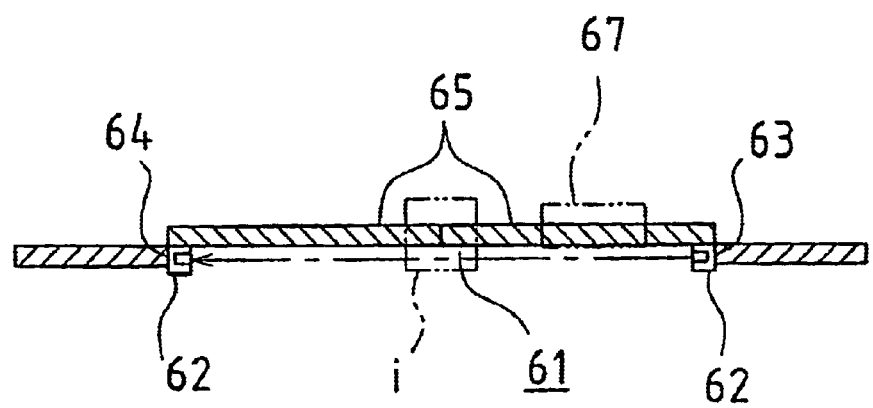
Figure 7A:
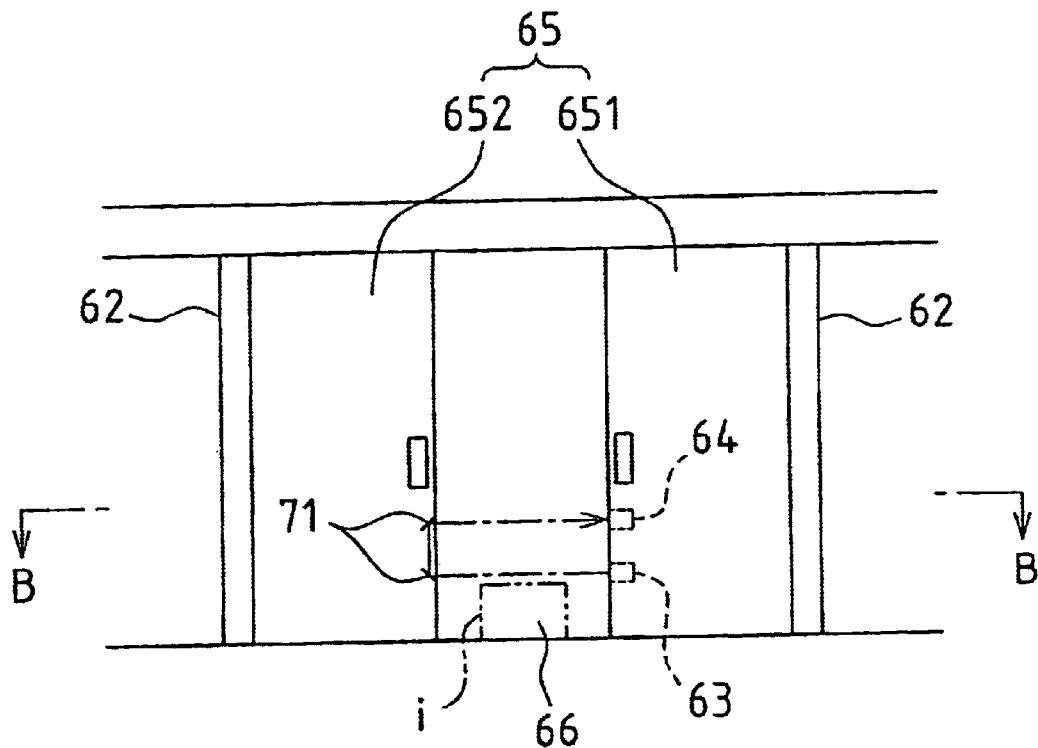
Figure 7B:
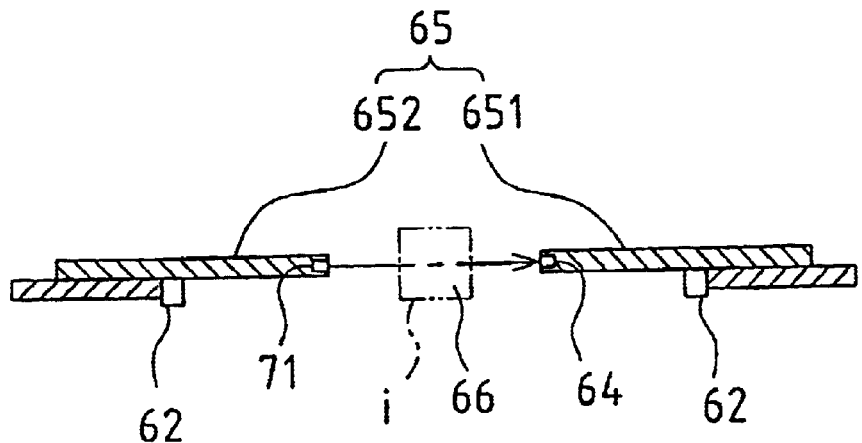

As far as the above embodiments are concerned, the sensor for automatic doors according to the present invention is applied as an auxiliary safety sensor, but the present invention should not be limited to such application. Additionally, the sensor for automatic doors according to the present invention can combine functions of an auxiliary safety sensor and an activation sensor, by extending a region to be covered by the cameras 51, 52. As shown in FIG. 5 (a view equivalent to that of FIG. 1), the sensor has an enlarged image pickup region, thereby combining functions of an auxiliary safety sensor and an activation sensor.

With regard to this structure, a detection area of an activation sensor (not shown) is set on an interior and exterior of doorway 2. An activation sensor circuit 50 for this activation sensor is built into auxiliary safety sensor 5. When a person or the like enters the detection area of the activation sensor, the activation sensor circuit 50 detects the object, based on outputs from the cameras 51, 52. Following this object detection, the activation sensor circuit 50 sends an object detection signal to automatic door controller 4, so as to start a driving motor of a door opening/closing mechanism and open door segments 1, 1. Otherwise, the auxiliary safety sensor 5 performs the same operations as mentioned above. Thus, the sensor can function as both an auxiliary safety sensor and an activation sensor.

The present invention is applicable not only to bi-parting automatic doors, as in the above embodiments, but also to single-sliding automatic doors.

In the above embodiments, a background object is defined as the floor 6, because the cameras 51, 52 are mounted on the transom 3 and have their image pickup direction oriented substantially downwardly. Alternatively, the present invention may be arranged to mount the cameras near the floor, with their image pickup direction oriented substantially upwardly. In this case, a ceiling or a wall is regarded as a background object.

The invention may be embodied in other specific forms without departing from the spirit or essential characteristics thereof The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

The present application is based on Japanese Patent Application No. 2001-51502, the contents of which is incorporated herein by reference. In addition, documents cited in this specification are incorporated herein by reference in their entirety.

What is claimed is:

1. A sensor for an automatic door, comprising:
   image pickup means for taking an image of a predetermined area around a door;
   distance measurement means for, upon receiving an output from said image pickup means, measuring a distance between said image pickup means and each object which is in the predetermined area and observed in the image taken of the predetermined area;
   object identification means for, upon receiving an output from said distance measurement means, identifying each object in the predetermined area, for which the distance between it and said image pickup means has been measured, as a background object or an object other than the background object based on the measured distance, and identifying the object other than the background object as the door or an object other than the door; and
   output means for, upon receiving an output from said object identification means, outputting an object detection signal for an object that is observed in the image taken of the predetermined area and is neither the background object nor the door.

2. The sensor for an automatic door according to claim 1, wherein the sensor is associated with door drive control means for controlling an open/close drive of the door, and
   wherein said output means is for outputting the object detection signal to said door drive control means so as to cause the door to open fully.

3. The sensor for an automatic door according to claim 2, wherein said image pickup means includes plural image pickup elements; and
   wherein said distance measurement means is for measuring a distance from said image pickup means to each object, which is in the predetermined area and observed in the image taken of the predetermined area, via stereo image processing which utilizes parallax of images taken by said plural image pickup elements.

4. The sensor for an automatic door according to claim 2, wherein said image pickup means has a variable focus lens; and
   wherein said distance measurement means is for measuring a distance from said image pickup means to each object, which is in the predetermined area and observed in the image taken of the predetermined area, based on a degree of focus of this object.

5. The sensor for an automatic door according to claim 1, wherein said image pickup means includes plural image pickup elements; and
   wherein said distance measurement means is for measuring a distance from said image pickup means to each object, which is in the predetermined area and observed in the image taken of the predetermined area, via stereo image processing which utilizes parallax of images taken by said plural image pickup elements.

6. The sensor for an automatic door according to claim 1, wherein said image pickup means has a variable focus lens; and
   wherein said distance measurement means is for measuring a distance from said image pickup means to each object, which is in the predetermined area and observed in the image taken of the predetermined area, based on a degree of focus of this object.

7. A sensor for an automatic door, comprising:
   image pickup means for taking an image of a predetermined area which covers a track of a door;
   distance measurement means for, upon receiving an output from said image pickup means, measuring a distance between said image pickup means and each object which is in the predetermined area and observed in the image taken of the predetermined area;
   floor detection means for, upon receiving an output from said distance measurement means, detecting a floor and a height and position of the floor such that the floor is distinguished from objects for which the distance between these objects and said image pickup means has been measured;
   object height/position detection means for, upon receiving outputs from said distance measurement means and said floor detection means, detecting a height and position of an object, other than the floor, which is in the predetermined area and observed in the image taken of the predetermined area, and is located at a different height and position relative to the height and position of the floor;

door position detection means for detecting whether the door is in an open position or a closed position along the track;

door position identification means for, upon receiving an output from said door position detection means, identifying a position of the door in the image taken of the predetermined area, based upon whether the door is in an open position or a closed position as detected by said door position detection means;

judgement means for, upon receiving outputs from said object/height position detection means and said door position identification means, judging whether the object, which is other than the floor, is the door or an object other than the door; and output means for, upon receiving an output from said judgement means, outputting an object detection signal for an object that is observed in the image taken of the predetermined area and is neither the floor nor the door.

8. The sensor for an automatic door according to claim 7, wherein the sensor is associated with door drive control means for controlling an open/close drive of the door along the track and for producing an output signal which corresponds to the position of the door, and wherein said door position detection means is for receiving the output signal from said door drive control means so as to determine whether the door is in an open position or a closed position.

9. The sensor for an automatic door according to claim 7, wherein said door position detection means is for determining whether the door is in an open position or a closed position based on the image of the predetermined area taken by said image pickup means.

10. The sensor for an automatic door according to claim 7, wherein the sensor is associated with door drive control means for controlling an open/close drive of the door along the track, and wherein said output means is for outputting the object detection signal to said door drive control means so as to cause the door to open fully.

11. The sensor for an automatic door according to claim 10, wherein said image pickup means includes plural image pickup elements; and wherein said distance measurement means is for measuring a distance from said image pickup means to each object, which is in the predetermined area and observed in the image taken of the predetermined area, via stereo image processing which utilizes parallax of images taken by said plural image pickup elements.

12. The sensor for an automatic door according to claim 10, wherein said image pickup means has a variable focus lens; and wherein said distance measurement means is for measuring a distance from said image pickup means to each object, which is in the predetermined area and observed in the image taken of the predetermined area, based on a degree of focus of this object.

13. The sensor for an automatic door according to claim 7, wherein said image pickup means includes plural image pickup elements; and wherein said distance measurement means is for measuring a distance from said image pickup means to each object, which is in the predetermined area and observed in the image taken of the predetermined area, via stereo image processing which utilizes parallax of images taken by said plural image pickup elements.

14. The sensor for an automatic door according to claim 7, wherein said image pickup means has a variable focus lens; and wherein said distance measurement means is for measuring a distance from said image pickup means to each object, which is in the predetermined area and observed in the image taken of the predetermined area, based on a degree of focus of this object.

* * * * *